(12) United States Patent
Aliakseyeu et al.

(10) Patent No.: US 11,140,761 B2
(45) Date of Patent: Oct. 5, 2021

(54) RESUMING A DYNAMIC LIGHT EFFECT IN DEPENDENCE ON AN EFFECT TYPE AND/OR USER PREFERENCE

(71) Applicant: SIGNIFY HOLDING B.V., Eindhoven (NL)

(72) Inventors: Dzmitry Viktorovich Aliakseyeu, Eindhoven (NL); Pieter Smith, Heeze (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/975,848

(22) PCT Filed: Feb. 14, 2019

(86) PCT No.: PCT/EP2019/053720
§ 371 (c)(1),
(2) Date: Aug. 26, 2020

(87) PCT Pub. No.: WO2019/162193
PCT Pub. Date: Aug. 29, 2019

(65) Prior Publication Data
US 2020/0413520 A1    Dec. 31, 2020

(30) Foreign Application Priority Data
Feb. 26, 2018  (EP) .................................. 18158608

(51) Int. Cl.
*H05B 47/155*    (2020.01)
*H05B 47/105*    (2020.01)
*H05B 47/19*     (2020.01)
*H05B 47/115*    (2020.01)

(52) U.S. Cl.
CPC ......... *H05B 47/105* (2020.01); *H05B 47/115* (2020.01); *H05B 47/155* (2020.01); *H05B 47/19* (2020.01)

(58) Field of Classification Search
CPC .... H05B 47/19; H05B 47/105; H05B 47/115; H05B 47/155; H05B 45/325; Y02B 20/40; H04N 5/2256
See application file for complete search history.

(56) References Cited

U.S. PATENT DOCUMENTS

| | | | | |
|---|---|---|---|---|
| 7,139,617 | B1 * | 11/2006 | Morgan | ............... H05B 47/155 700/17 |
| 9,857,944 | B2 * | 1/2018 | Shim | ...................... G06F 3/0488 |
| 10,536,618 | B2 * | 1/2020 | Bund | .................... H04N 5/2256 |
| 10,694,613 | B2 * | 6/2020 | Mann | ...................... H05B 47/19 |
| 2008/0140231 | A1 | 6/2008 | Blackwell et al. | |
| 2011/0157476 | A1 | 6/2011 | Arling et al. | |

FOREIGN PATENT DOCUMENTS

| | | |
|---|---|---|
| EP | 2469850 A2 | 6/2012 |
| WO | 199475 A1 | 12/2001 |
| WO | 2016079462 A1 | 5/2016 |
| WO | 2018054705 A1 | 3/2018 |

* cited by examiner

*Primary Examiner* — Haissa Philogene

(57) ABSTRACT

An electronic device is configured to control one or more light sources, to render a dynamic light effect, control the one or more light sources to pause the dynamic light effect at a first moment (72), and control the one or more light sources to resume the dynamic light effect at a second moment (73) in a manner (63-66) which depends on a type of the dynamic light effect and/or a user preference indicated for the dynamic light effect.

11 Claims, 4 Drawing Sheets

RESUMING A DYNAMIC LIGHT EFFECT IN DEPENDENCE ON AN EFFECT TYPE AND/OR USER PREFERENCE

CROSS-REFERENCE TO PRIOR APPLICATIONS

This application is the U.S. National Phase application under 35 U.S.C. § 371 of International Application No. PCT/EP2019/053720, filed on Feb. 14, 2019, which claims the benefit of European Patent Application No. 18158608.2, filed on Feb. 26, 2018. These applications are hereby incorporated by reference herein.

FIELD OF THE INVENTION

The invention relates to an electronic device for controlling one or more light sources.

The invention further relates to a method of controlling one or more light sources.

The invention also relates to a computer program product enabling a computer system to perform such a method.

BACKGROUND OF THE INVENTION

The versatility of connected lighting systems keeps growing, offering more and more features to their users. These new features include new sensors, new types of user control, smart automated behavior, new forms of light usage (e.g. entertainment), amongst others. Lighting systems are also becoming connected with other smart home systems and can be controlled from a plurality of physical devices, cloud services, or can be driven by other form of content such as video or audio. As a result, dynamic light effects (sometimes referred to as dynamic light scenes) are gaining popularity.

In order to ensure that the user stays in control, a pause feature can be implemented that allows the user to pause and resume playback of a dynamic light effect. US 2008/0140231 A1 discloses a method for authoring and playing back lighting programs that define a plurality of states for a plurality of lights. Lighting programs may be stored in a data format that represents a data stream capable of controlling the plurality of lights. In an embodiment, playback of a lighting program may be paused and then later resumed from the point of pausing. However, resuming from the point of pausing is frequently not the behavior that the user desires.

WO01/99475A1 discloses a system for executing a lighting sequence on a plurality of lighting units, wherein playback may be paused and resumed.

EP2469850A2 discloses a personal video recorder device which enables a user to pause and resume the display of the video content.

SUMMARY OF THE INVENTION

It is a first object of the invention to provide a method, which allows resumption of paused dynamic light scenes with behavior that is suitable for many situations.

It is a second object of the invention to provide an electronic device, which is able to resume paused dynamic light scenes with behavior that is suitable for many situations.

In a first aspect of the invention, the electronic device comprises at least one processor configured to control one or more light sources to render a dynamic light effect, control said one or more light sources to pause said dynamic light effect, and control said one or more light sources to resume said dynamic light effect in a manner which depends on a type of said dynamic light effect and/or a user preference indicated for said dynamic light effect. In other words, one of a plurality of manners of resuming is selected based on said type of said dynamic light effect and/or said user preference indicated for said dynamic light effect. Said at least one processor may be configured to control said one or more light sources to pause said dynamic light effect upon receiving a first control command and control said one or more light sources to resume said dynamic light effect upon receiving a second control command and/or upon expiry of a time out.

The inventors have recognized that a user desires different resumption behavior depending on the situation, and in particular depending on a type of the dynamic light effect and/or a user preference indicated for the dynamic light effect. The inventors have recognized that by resuming the dynamic light effect in a manner which depends on a type of the dynamic light effect and/or a user preference indicated for the dynamic light effect, the resumption behavior can be adapted to the situation at hand.

The type of the dynamic light effect may indicate whether the dynamic light effect is driven by other (e.g. audio or video) content, whether the dynamic light effect is driven by an external source based on data other than content (e.g. local or remote sensor data or online data), whether the dynamic light effect is a stochastic/algorithmic effect that is generated based on a certain algorithm and/or whether the dynamic light effect is a predefined (e.g. time-based) effect such as a wake-up effect, for example. The external source may be a temperature sensor, for example. In this case, an algorithm that translates real-time fluctuations of the temperature into dynamic light effects may be used. By allowing a user to indicate a preference for the dynamic light effect and/or the type of the dynamic light effect, the resumption behavior can be optimized for this user. Said at least one processor may be configured to determine said user preference from a (stored) configuration (file) and/or from user input, for example.

Said at least one processor may be configured to receive a stream of light commands, control said one or more light sources to render said dynamic light effect on the basis of said light commands, and control said one or more light sources to resume said dynamic light effect by skipping light commands received between pausing and resuming said dynamic light effect. This may be beneficial if the electronic device is a bridge between a content rendering device and the one or more light sources, for example. Skipping light commands may be desirable if the dynamic light effect is driven by other content, such as a movie, that has not been paused.

Said at least one processor may be configured to receive a stream of light commands, control said one or more light sources to render said dynamic light effect on the basis of said light commands, and control said one or more light sources to resume said dynamic light effect by controlling said one or more light sources on the basis of light commands received between pausing and resuming said dynamic light effect. This may be beneficial if the electronic device is a bridge between a content rendering device and the one or more light sources, for example. This resumption behavior ensures that the entire dynamic light effect is rendered. This may be desirable if an entirely authored (i.e. manually created) light script is rendered.

Said at least one processor may be configured to control said one or more light sources to resume said dynamic light effect by controlling said one or more light sources on the basis of light commands received between pausing and resuming said dynamic light effect at a speed which is faster than normal. This may be desirable if, for example, the dynamic light effect is normally followed by another dynamic light effect that is time-triggered (e.g. scheduled to start at a certain time or after a certain time has elapsed).

It may also be beneficial to control the one or more light sources to resume the dynamic light effect at a speed which is faster than normal if the dynamic light effect is driven by an external source based on data other than content, e.g. sensor data. This allows the user to quickly preview what was missed and then catch up with the real-time data. For example, if the external source is a temperature sensor, the dynamic light effect might be paused for 10 minutes and upon resuming, the part of the dynamic light effect that would have been rendered in these 10 minutes might be rendered within one minute.

After this one minute, the rendering of the dynamic light effect will have caught up with the real-time data and the dynamic light effect can then be rendered based on the real-time data again. The part of the dynamic light effect that is based on data coming in while catching up with the real-time data is preferably also rendered at a faster speed. In the above example, the part of the dynamic light effect that would have been rendered in 11 minutes will then be rendered in one minute based on 10 minutes of data received while pausing plus one minute of data that was received while catching up.

Said at least one processor may be configured to further control said one or more light sources on the basis of light commands received after resuming said dynamic light effect at a speed which is faster than normal. This may be beneficial if the dynamic light effect should finish at the same time it would have finished if the dynamic light effect had not been paused, but when it is not desirable to render only the light commands received between pausing and resuming said dynamic light effect at a speed which is faster than normal, e.g. because the rendering would become too dynamic/fast.

Said at least one processor may be configured to determine said speed such that said dynamic light effect will finish at the same time it would have finished if said dynamic light effect had not been paused. This reduces the risk of light effects being requested to be rendered simultaneously. Alternatively, the at least one processor may be configured to determine the speed based on how quickly the system needs to catch up with real-time data. In this case, the speed would typically depend on the time the dynamic light effect has been paused plus the time allocated to catching up with the real-time data.

Said at least one processor may be configured to render said dynamic light effect by transmitting a stream of light commands, suspending transmission of said light commands in order to pause said dynamic light effect and resuming transmission of said light commands in order to resume said dynamic light effect. This may be beneficial if the electronic device is a content rendering device, for example. In this case, the bridge (if present) and the lighting devices are not required to support dynamic light effect pausing and resumption.

Said at least one processor may be configured to control said one or more light sources to render one or more static light effects while said dynamic light effect is paused. This allows suitable lighting to be rendered while the dynamic light effect is paused.

In a second aspect of the invention, the method comprises controlling one or more light sources to render a dynamic light effect, controlling said one or more light sources to pause said dynamic light effect, and controlling said one or more light sources to resume said dynamic light effect in a manner which depends on a type of said dynamic light effect and/or a user preference indicated for said dynamic light effect. The method may be implemented in hardware and/or software.

Controlling said one or more light sources to resume said dynamic light effect may comprise controlling said one or more light sources to resume said dynamic light effect in a manner which depends on a user preference indicated for said type of said dynamic light effect.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: controlling one or more light sources to render a dynamic light effect, controlling said one or more light sources to pause said dynamic light effect, and controlling said one or more light sources to resume said dynamic light effect in a manner which depends on a type of said dynamic light effect and/or a user preference indicated for said dynamic light effect.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
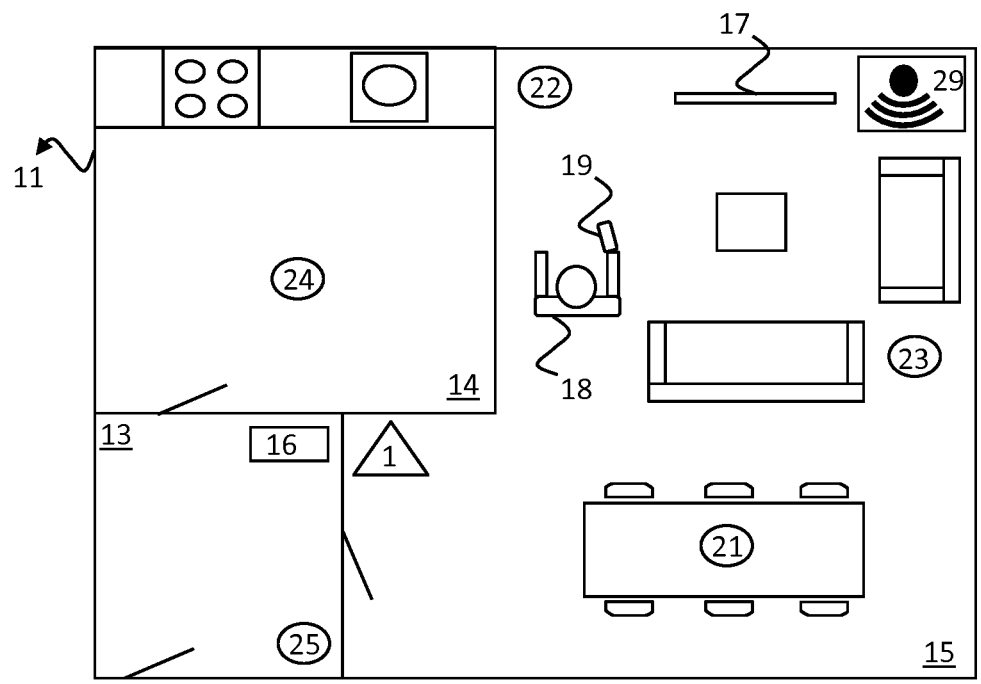
FIG. 1 depicts an example of an environment in which a first embodiment of the electronic device may be used.

FIG. 1 depicts a floor 11 of a home that consist of a hall 13, a kitchen 14 and a living room 15. Five lights have been installed on floor 11: a light 24 in the kitchen 14, a light 25 in the hall 13, and lights 21-23 in the living room 15. Light 21 has been installed above a dinner table, light 22 has been installed to the left of a Television 17, and light 23 has been installed next to two couches. Furthermore, a motion detector 29 has been installed to the right of the Television 17. The lights 21-25 and the motion detector 29 are connected wirelessly to a bridge 1, e.g. via ZigBee or a protocol based on ZigBee. The bridge 1 is connected to a wireless access point 16, via a wire or wireless.

In the example depicted in FIG. 1, a person 18 is present on floor 11 and is using a mobile phone 19. The person 18 is also referred to as user 18. The mobile phone 19 is also connected (wirelessly) to the wireless access point 16. The mobile phone 19 may further be connected to a base station of a cellular communication network, e.g. an eNodeB of an LTE network. The user 18 may use mobile phone 19 as a content rendering device. The user 18 may also use mobile phone 19 to assign lights to rooms, to manually control the lights and/or to add, change and delete (e.g. time-based) routines. Television 17 may also be used as content rendering device. The bridge 1 acts as bridge between content rendering device(s) (and other control devices) and light(s).

Figure 2:
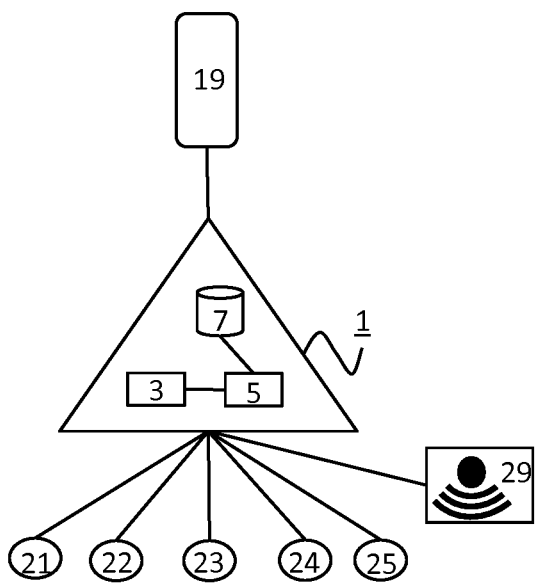
FIG. 2 is a block diagram of the first embodiment of FIG. 1.

In the example depicted in FIG. 1, the invention is implemented in bridge 1. A block diagram of bridge 1 is shown in FIG. 2. The bridge 1 comprises a processor 5, a transceiver 3 and storage means 7. The processor 5 is configured to control lights 22 and 23 to render a dynamic light effect, control the lights 22 and 23 to pause the dynamic light effect, and control the lights 22 and 23 to resume the dynamic light effect in a manner which depends on a type of the dynamic light effect and/or a user preference indicated for the dynamic light effect.

In the embodiment of FIG. 2, the processor 5 is configured to control the lights 22 and 23 to pause the dynamic light effect upon receiving a first control command (e.g. received from the mobile device 19 when the user touches a pause button on a touchscreen of the mobile device 19) and control the lights 22 and 23 to resume the dynamic light effect upon receiving a second control command (e.g. received from the mobile device 19 when the user touches the pause button on the touchscreen of the mobile device 19 again) and/or upon expiry of a time out. The pause function allows a user to pause a dynamic light effect and resumes the dynamic light effect after an explicit user action or a predefined timeout. Both pausing and resuming actions lead to a change in the behavior of the lighting system. When paused, the dynamic effect temporarily stops, leaving the lights 22 and 23 in their current state.

In the embodiment of FIG. 2, the pause action can be explicitly initiated by the user through a physical control or an app running on mobile device 19. Alternatively or additionally, special system events or manual controls triggering a new light effect with a higher priority might result in the currently running dynamic effect automatically being paused.

In the embodiment of FIG. 2, the processor 5 is configured to control the lights 22 and 23 to render one or more static light effects while the dynamic light effect is paused. After a pause action, the lights still respond to actions that render static light effects. For example, if dynamic effects that are driven by on-screen content have been paused, the user is still able to control the light via the mobile device 19 or a physical light switch. Dynamic effects normally take precedence over static effects. For example, time-based routines or sensor-based routines cannot trigger a static light effect while a dynamic effect is controlling the lights. When a dynamic light effect is paused, other events and routines (e.g. routines triggered by motion detector 29) by can once again render a static light effect (and optionally, another dynamic light effect).

In the above examples, the dynamic light effect is paused and resumed on both lights 22 and 23. It may also be possible to pause a dynamic light effect on a subset of the lights that are (currently) rendering the dynamic light effect, e.g. only pause the dynamic light effect on light 22, while continuing to render the dynamic light effect on light 23.

In the embodiment of the bridge 1 shown in FIG. 2, the bridge 1 comprises one processor 5. In an alternative embodiment, the bridge 1 comprises multiple processors. The processor 5 of the bridge 1 may be a general-purpose processor, e.g. from ARM, Intel or AMD or an application-specific processor. The processor 5 of the bridge 1 may run a Unix-based operating system for example. The transceiver 3 may use one or more wired and/or one or more wireless communication technologies to communicate with the lights 21-25, the motion detector 29 and the wireless internet access point 16, e.g. Ethernet, Wi-Fi, ZigBee (or a protocol based on ZigBee) and/or Bluetooth. The bridge 1 may use the transceiver 3 to communicate with the mobile phone 19 and/or with devices on the Internet via the wireless internet access point 16.

In an alternative embodiment, multiple transceivers are used instead of a single transceiver, e.g. one for ZigBee and one for Wi-Fi. In the embodiment shown in FIG. 2, a receiver and a transmitter have been combined into a transceiver 3. In an alternative embodiment, one or more separate receiver components and one or more separate transmitter components are used. The storage means 7 may comprise one or more memory units. The storage means 7 may comprise solid state memory, for example. The storage means 7 may be used to store information on connected devices (e.g. lights and accessory devices) and configuration information (e.g. in which rooms connected devices are located, routines and/or associations between buttons and light scenes), for example. The bridge 1 may comprise other components typical for a bridge such a power connector. The invention may be implemented using a computer program running on one or more processors.

Figure 3:
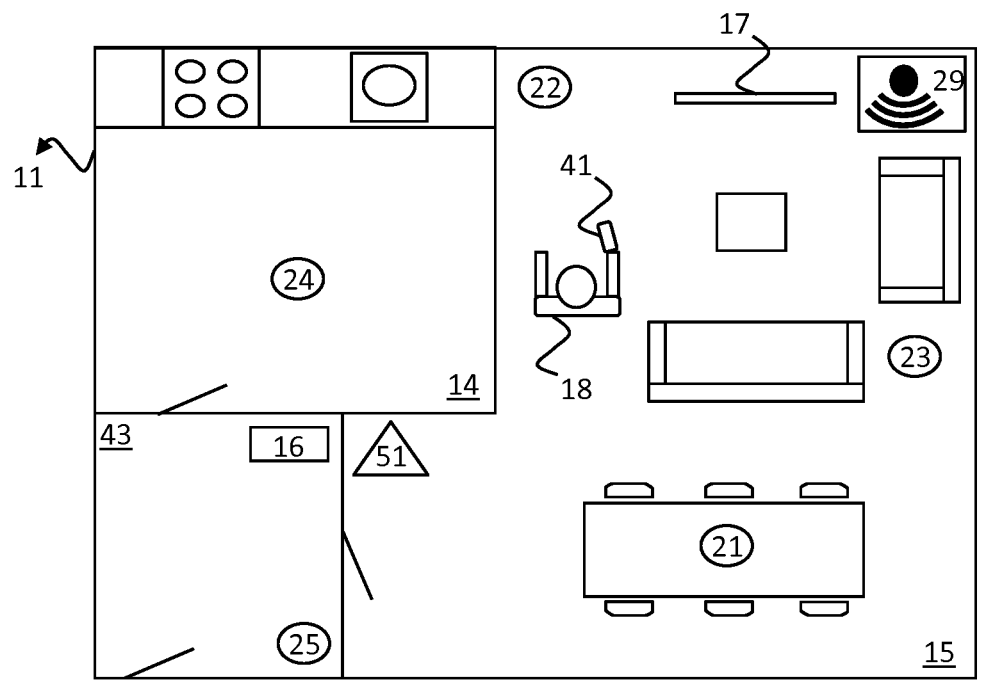
FIG. 3 depicts an example of an environment in which a second embodiment of the electronic device may be used.

In the example depicted in FIG. 3, the invention is implemented in mobile device 41. The mobile device 41 may be a mobile phone or tablet, for example. In this example, a conventional bridge 51 is used. Alternatively, the mobile device 41 may be able to control lights 21-25 without a bridge. A block diagram of mobile device 41 is shown in FIG. 2. The mobile device 41 comprises a processor 45, a transceiver 43, storage means 47 and a display 49. The processor 45 is configured to control lights 22 and 23 to render a dynamic light effect, control the lights 22 and 23 to pause the dynamic light effect, and control the lights 22 and 23 to resume the dynamic light effect in a manner which depends on a type of the dynamic light effect and/or a user preference indicated for the dynamic light effect.

Figure 4:
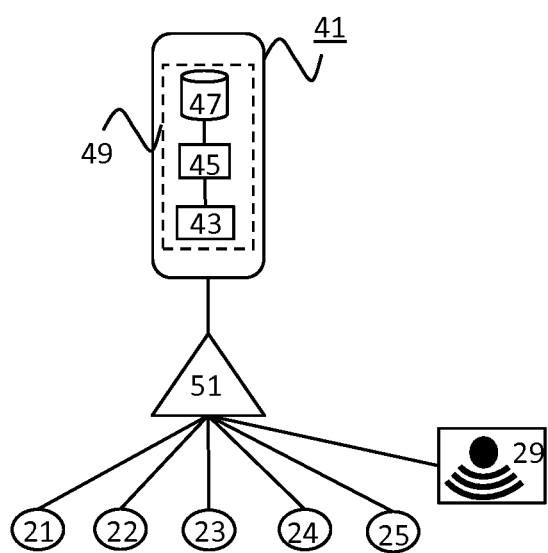
FIG. 4 is a block diagram of the second embodiment of FIG. 3.

In the embodiment of FIG. 4, the processor 45 is configured to render the dynamic light effect by transmitting a stream of light commands, suspending transmission of the light commands in order to pause the dynamic light effect and resuming transmission of the light commands in order to resume the dynamic light effect.

In the embodiment of the mobile device 41 shown in FIG. 4, the mobile device 41 comprises one processor 45. In an alternative embodiment, the mobile device 41 comprises multiple processors. The processor 45 of the mobile device 41 may be a general-purpose processor, e.g. from ARM or Qualcomm or an application-specific processor. The processor 45 of the mobile device 41 may run a Google Android or Apple iOS operating system for example. The transceiver 43 may use one or more wireless communication technologies to communicate with the wireless internet access point 16, e.g. Wi-Fi and/or Bluetooth. The mobile device 41 may use the transceiver 43 to communicate with the bridge 51 and/or with devices on the Internet via the wireless internet access point 16. In an alternative embodiment, multiple transceivers are used instead of a single transceiver, e.g. one for Bluetooth and one for Wi-Fi.

In the embodiment shown in FIG. 4, a receiver and a transmitter have been combined into a transceiver 43. In an alternative embodiment, one or more separate receiver components and one or more separate transmitter components are used. The storage means 47 may comprise one or more memory units. The storage means 47 may comprise solid state memory, for example. The storage means 47 may be used to store an operating system, apps, content and other data, for example. The display 49 may comprise an LCD or OLED display panel, for example. The display 49 may be a touch screen. The mobile device 41 may comprise other components typical for a mobile device such a battery. The invention may be implemented using a computer program running on one or more processors.

In the embodiment of FIG. 2, the invention is implemented in a bridge. In the embodiment of FIG. 4, the invention is implemented in a mobile device. In an alternative embodiment, the invention may be implemented in a separate device connected to a bridge or in a light, for example. The invention may be partly or wholly implemented in a server on the Internet (e.g. a cloud server).

In a favorable embodiment, the dynamic light effect is resumed in a manner which depends on a type of the dynamic light effect. For example:

In the case of predefined time-based effects (such as wake up), the lighting system (e.g. bridge 1 of FIG. 1 or mobile device 41 of FIG. 3) could speed up the dynamic light effect to compensate the time it was paused (e.g. if a wake-up effect should last 30 minutes and it was paused for 5 minutes, the light transition should happen 5 minutes faster), it could jump directly to the state the lighting system should be at that point of time, thereby skipping all intermediate states, or it could extend the timing and continue rendering the dynamic light effect from the moment it was paused.

In the case of dynamic effects driven by other content such as a movie, if pausing the light effect does not pause the other content, then after resuming, the light effect should realign with the current state of the other content. Rendering a missed part of the dynamic effect would not make sense in this case. If the invention is (only) implemented in a bridge, the light commands will still be sent to the bridge during a pause, but the bridge will ignore them. If the invention is implemented in a content rendering device, the content rendering device (e.g. a mobile device running a content rendering app) will stop sending light commands until the dynamic effect is resumed.

Figure 5:
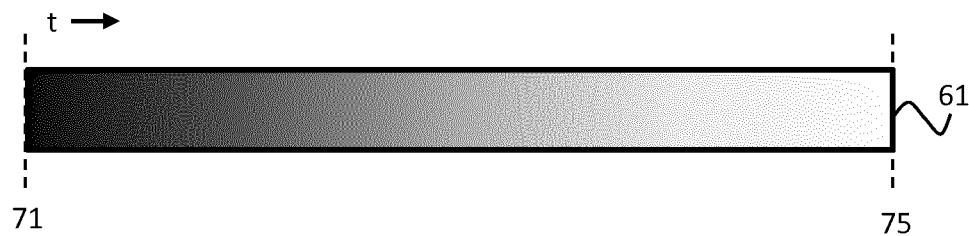
FIG. 5 depicts a dynamic wakeup light effect.
Figure 6:
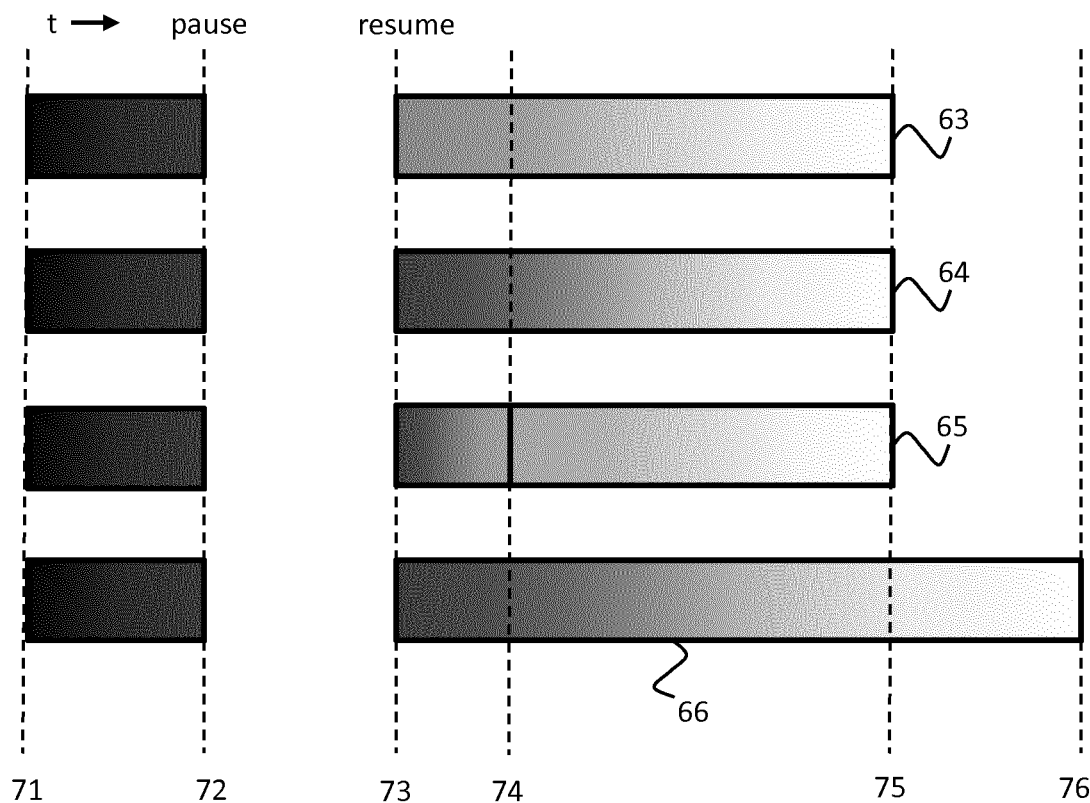
FIG. 6 depicts the dynamic wakeup light effect of FIG. 5 being paused and resumed in several manners.

The above two examples are illustrated with the help of FIGS. 5 and 6. FIG. 5 depicts a rendered light effect 61 for a dynamic wake-up light effect. The light is off until a moment 71 when it starts to gradually increase in brightness until moment 75 at which the light has reached maximal brightness.

In FIG. 6, the dynamic light effect is paused between moments 72 and 73. The rendered light effect 63 does not include any part of the dynamic wake-up light effect that would have been rendered between moments 72 and 73 if the dynamic light effect had not been paused (this corresponds to the second example above). The rendering of the dynamic light effect is resumed at moment 73 and completed at moment 75, which is the same moment that the rendered light effect 61 of FIG. 5 (which was not paused) finished. If the invention is implemented in the bridge 1 of FIG. 1, the processor 5 of the bridge 1 would typically be configured to receive a stream of light commands, control the lights 22 and 23 to render the dynamic light effect on the basis of the light commands, and control the lights 22 and 23 to resume the dynamic light effect by skipping light commands received between pausing and resuming the dynamic light effect.

In contrast, in the rendered light effects 64, 65 and 66, no part of the dynamic wake-up light effect is skipped. If the invention is implemented in the bridge 1 of FIG. 1, the processor 5 of the bridge 1 would typically be configured to control the lights 22 and 23 to resume the dynamic light effect by controlling the lights 22 and 23 on the basis of light commands received between pausing and resuming the dynamic light effect.

In the rendered light effects 64 and 65, the part of the dynamic wake-up light effect that would have been rendered between moments 72 and 73 if the dynamic light effect had not been paused is rendered at a higher speed after resumption. For example, light commands received between pausing and resuming the dynamic light effect are rendered at a speed which is faster than normal. In the rendered light effect 65, only the part of the dynamic wake-up light effect that would have been rendered between moments 72 and 73 if the dynamic light effect had not been paused is rendered at a higher speed. The rendered light effect 65 catches up to the rendered light effect 61 of FIG. 5 between moments 73 and 74, after which the dynamic wake-up light effect is rendered at the normal speed and rendered lights effects 61 and 65 are identical.

In the rendered light effect 64, a part of the dynamic wake-up light that would have been rendered after moment 73 if the dynamic light effect had not been paused is rendered at a higher speed (i.e. a speed faster than normal) as well. The dynamic wake-up light effect is rendered at a higher speed than normal between moments 73 and 75 in the rendered light effect 64, but this speed is lower than the speed at which the dynamic wake-up light effect is rendered between moments 73 and 74 in rendered light effect 65. The speeds at which the dynamic wake-up light effect is rendered in rendered light effects 64 and 65 has been determined such that the dynamic light effect will finish at the same time it would have finished if the dynamic light effect had not been paused.

In rendered light effect 66, no part of the dynamic wake-up light effect is skipped or rendered at a higher speed. As a result, the rendered light effect 66 finishes later than the rendered light effects 63-65, at moment 76 instead of moment 75.

In the example of FIG. 1, the pausing of dynamic light effects is implemented in the bridge 1. The bridge 1 does not (immediately) render light commands received while the dynamic light effect is paused. The bridge 1 determines in which manner the lights are controlled to resume the dynamic light effect. If the light commands received while the dynamic light effect is paused need to be sped up and not skipped, the bridge 1 should either store/buffer these light commands in its storage means for the duration of the pause action, or there should be a possibility for the bridge 1 to request the content rendering device to repeat them.

If the pausing of dynamic light effects is implemented in the content rendering device, e.g. mobile device 41 of FIG. 3, the content rendering device determines in which manner the lights are controlled to resume the dynamic light effect. If the dynamic light effect is driven by an external source (e.g. local or remote sensor data or online data), the content rendering device may store the data arriving while the dynamic light effect is paused and translate them to light commands only when the dynamic light effect is resumed if this behavior is desired (which depends on the type of the dynamic light effect and/or a user preference indicated for the dynamic light effect).

In an embodiment, the bridge 1 or the content rendering device takes user preferences into account when determining in which manner the lights are controlled to resume the dynamic light effect. These user preferences may be indicated per dynamic light effect and/or per type of dynamic light effect, for example. These user preferences may be determined from a configuration (file) stored in the bridge 1, in the content rendering device or in the cloud, for example. As a first example, it may be possible for user 18 to indicate his preferences on mobile device 19 of FIG. 1, which are then stored in a configuration (file) on bridge 1. As a second example, it may be possible for user 18 to indicate his preferences on mobile device 41, which are then stored in a configuration (file) on mobile device 41.

Alternatively, user 18 may be able to indicate his preference upon pausing a dynamic light effect. For example, in a user interface of a mobile device, pressing a first button results in a part of the dynamic light effect being skipped, pressing a second button results in a part of the dynamic light effect being sped up and pressing a third button neither results in a part of the light effect being skipped nor in a part of the dynamic light effect being sped up. User input may alternatively be provided using speech commands, for example.

Figure 7:
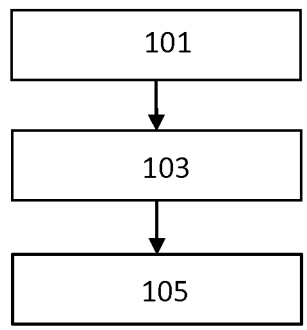
FIG. 7 is a flow diagram of an embodiment of the method of the invention.

An embodiment of the method of the invention is shown in FIG. 7. A step 101 comprises controlling one or more light sources to render a dynamic light effect. A step 103 comprises controlling the one or more light sources to pause the dynamic light effect. A step 105 comprises controlling the one or more light sources to resume the dynamic light effect in a manner which depends on a type of the dynamic light effect (and optionally a user preference indicated for this type) and/or a user preference indicated for the dynamic light effect.

Figure 8:
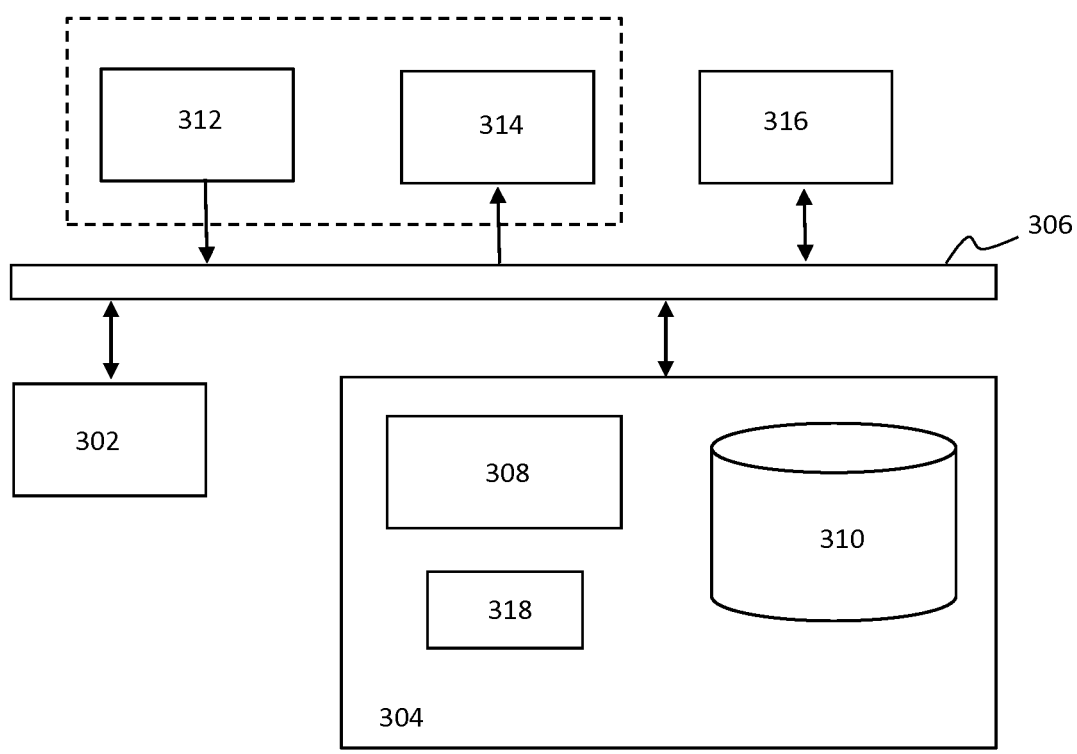
FIG. 8 is a block diagram of an exemplary data processing system for performing the method of the invention.

FIG. 8 depicts a block diagram illustrating an exemplary data processing system that may perform the method as described with reference to FIG. 7.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. An electronic device comprising at least one processor configured to:
   receive a stream of light commands;
   control one or more light sources to render a dynamic light effect on the basis of said light commands,
   control said one or more light sources to pause said dynamic light effect, and
   control said one or more light sources to resume said dynamic light effect by controlling said one or more light sources on the basis of light commands received between pausing and resuming said dynamic light effect at a speed which is faster than normal, wherein said at least one processor is configured to determine said speed such that said dynamic light effect will finish at the same time it would have finished if said dynamic light effect had not been paused.

2. An electronic device as claimed in claim 1, wherein said at least one processor is configured to control said one or more light sources to resume said dynamic light effect in a manner which further depends on a user preference indicated for a type of said dynamic light effect.

3. An electronic device as claimed in claim 2, wherein said at least one processor is configured to determine said user preference from a stored configuration file and/or from user input.

4. An electronic device as claimed in claim 1, wherein said at least one processor is configured to control said one or more light sources to pause said dynamic light effect upon receiving a first control command and control said one or more light sources to resume said dynamic light effect upon receiving a second control command and/or upon expiry of a time out.

5. An electronic device as claimed in claim 1, wherein said electronic device is a bridge between a content rendering device and said one or more light sources.

6. An electronic device (1, 41) as claimed in claim 1, wherein said at least one processor (5, 45) is configured to further control said one or more light sources (22,23) on the basis of light commands received after resuming said dynamic light effect at a speed which is faster than normal.

7. An electronic device as claimed in claim 1, wherein said at least one processor is configured to render said dynamic light effect by transmitting a stream of light commands, suspending transmission of said light commands in order to pause said dynamic light effect and resuming transmission of said light commands in order to resume said dynamic light effect.

8. An electronic device as claimed in claim 1, wherein said at least one processor is configured to control said one or more light sources to render one or more static light effects while said dynamic light effect is paused.

9. A method of controlling one or more light sources, comprising:
   receive a stream of light commands;
   controlling one or more light sources to render a dynamic light effect on the basis of said light commands;
   controlling said one or more light sources to pause said dynamic light effect; and
   controlling said one or more light sources to resume said dynamic light effect by controlling said one or more light sources on the basis of light commands received between pausing and resuming said dynamic light effect at a speed which is faster than normal, wherein said at least one processor is configured to determine said speed such that said dynamic light effect will finish at the same time it would have finished if said dynamic light effect had not been paused.

10. A computer program or suite of computer programs comprising at least one software code portion or a computer program product storing at least one software code portion, the software code portion, when run on a computer system, being configured for enabling the method of claim 9 to be performed.

11. A method as claimed in claim 9, wherein controlling said one or more light sources to resume said dynamic light effect comprises controlling said one or more light sources to resume said dynamic light effect in a manner which further depends on a user preference indicated for a type of said dynamic light effect.

* * * * *